United States Patent [19]

Wicks et al.

[11] Patent Number: 4,766,818
[45] Date of Patent: Aug. 30, 1988

[54] TRAIN OF HIGHWAY TRAILERS AND METHOD OF MAKING

[75] Inventors: Harry O. Wicks; Monte P. Riefler, both of Hamburg, N.Y.

[73] Assignee: Railmaster System, Inc., Hamburg, N.Y.

[21] Appl. No.: 900,547

[22] Filed: Aug. 26, 1986

Related U.S. Application Data

[63] Continuation of Ser. No. 740,650, Jun. 3, 1985, Pat. No. 4,669,391, which is a continuation-in-part of Ser. No. 469,215, Feb. 24, 1983, abandoned.

[51] Int. Cl.$^4$ .............................................. B61D 3/12
[52] U.S. Cl. ..................................... 105/4.3; 213/188; 280/408; 410/53
[58] Field of Search ............... 105/4.1, 4.2, 4.3, 215.2, 105/159; 410/44, 45, 53, 54; 280/408, 423 A, 476 R; 213/86, 88, 89, 90, 175, 178, 179, 188

[56] References Cited

U.S. PATENT DOCUMENTS 4,456,413  6/1984  Pavlick .................................. 105/4.1
4,585,133  4/1986  Cope ..................................... 213/206

FOREIGN PATENT DOCUMENTS 287955  3/1928  United Kingdom .

OTHER PUBLICATIONS

Railmaster, "The Intermodal Revolution", late Sep. 1984.

Caprino, "New Truck-Rail System Eyed Here", Buffalo Evening News, 10/6/84.

Primary Examiner—Sherman D. Basinger
Assistant Examiner—Jesûs D. Sotelo
Attorney, Agent, or Firm—Marshall, O'Toole, Gerstein, Murray & Bicknell

[57] ABSTRACT

Novel highway trailers can be mounted on railtruck assemblies to form a train of highway trailers, the railtruck assemblies including a conventional railtruck which supports a novel intermodal adaptor. The novel highway trailers include a forwardly extending tongue and coupling structure at the rear to which may be secured the tongue of a following trailer and the intermodal adaptor of a railtruck assembly. The intermodal adaptor is mounted on the center plate bowl of the bolster of the railtruck. The adaptor includes a locating assembly adapted to be received within the coupling structure of a leading highway trailer, which locating assembly permits the leading highway trailer and intermodal adaptor to become aligned with each other upon relative movement. The intermodal adaptor further includes a securing assembly capable of maintaining the locating assembly within the coupling structure of the highway trailer in a completely mounted position, a coupler pin, and a shifting device capable of moving the coupler pin from a lower position to a raised position where it couples the forward end of a tongue of a following trailer to the rear of the leading trailer and the intermodal adaptor.

37 Claims, 15 Drawing Sheets

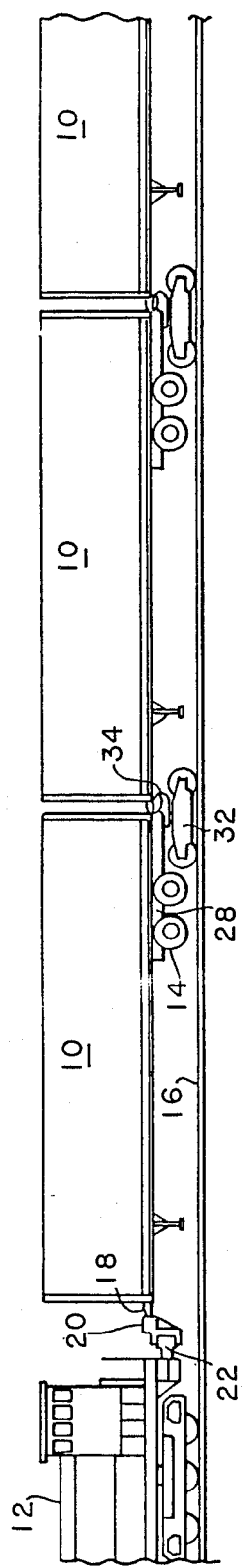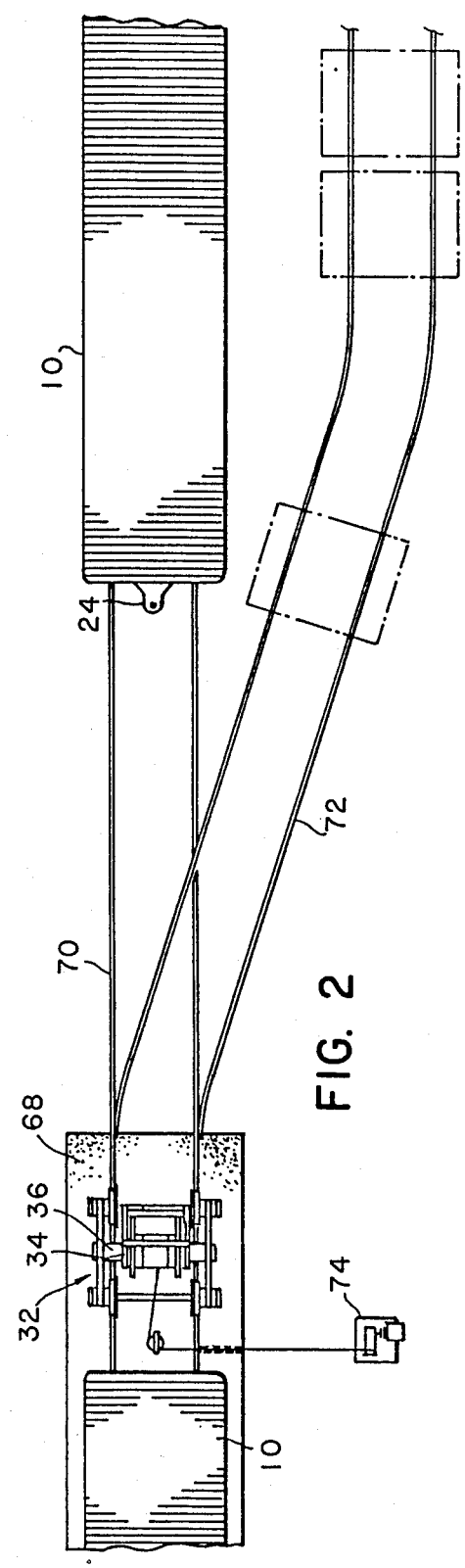

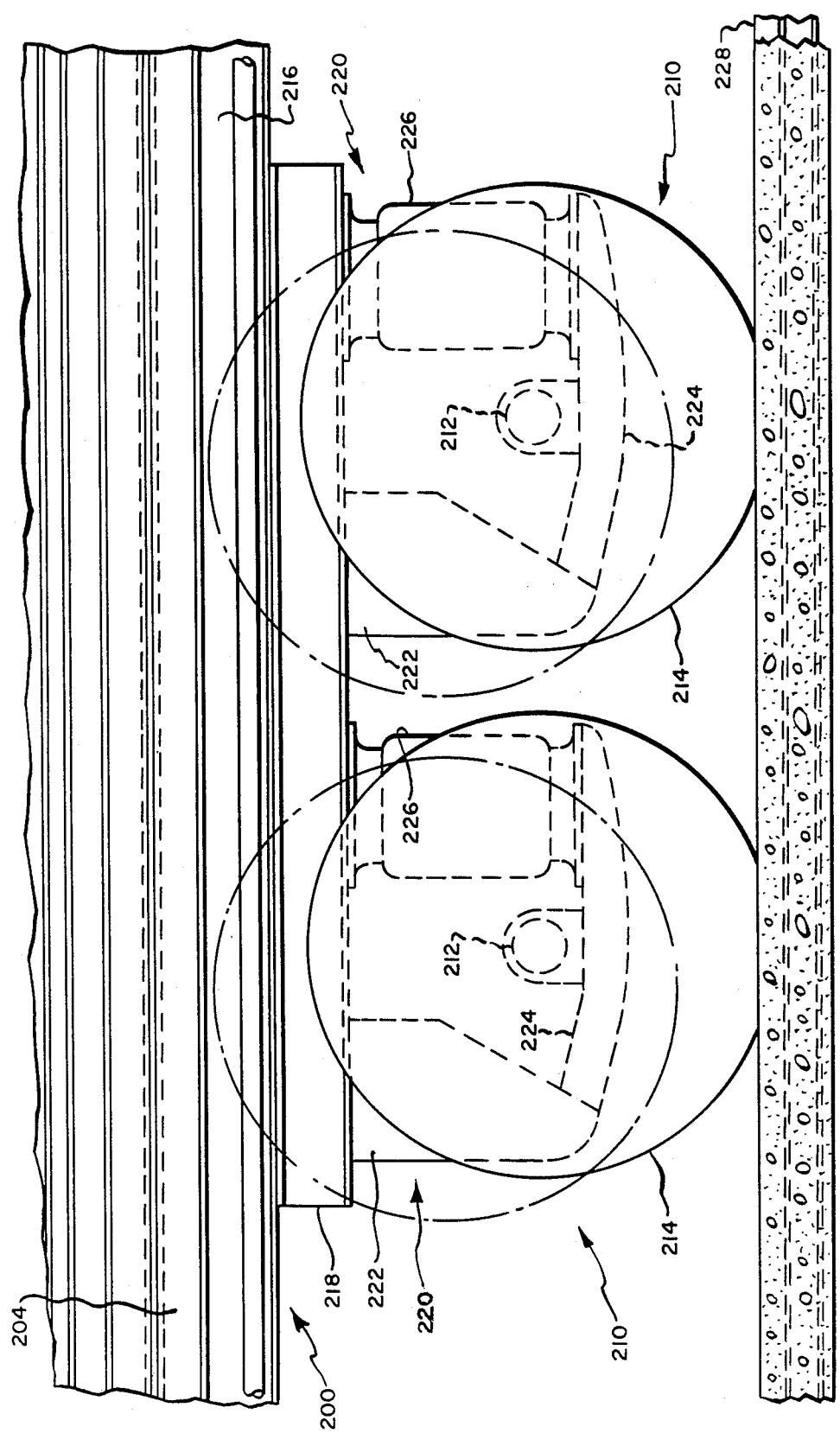

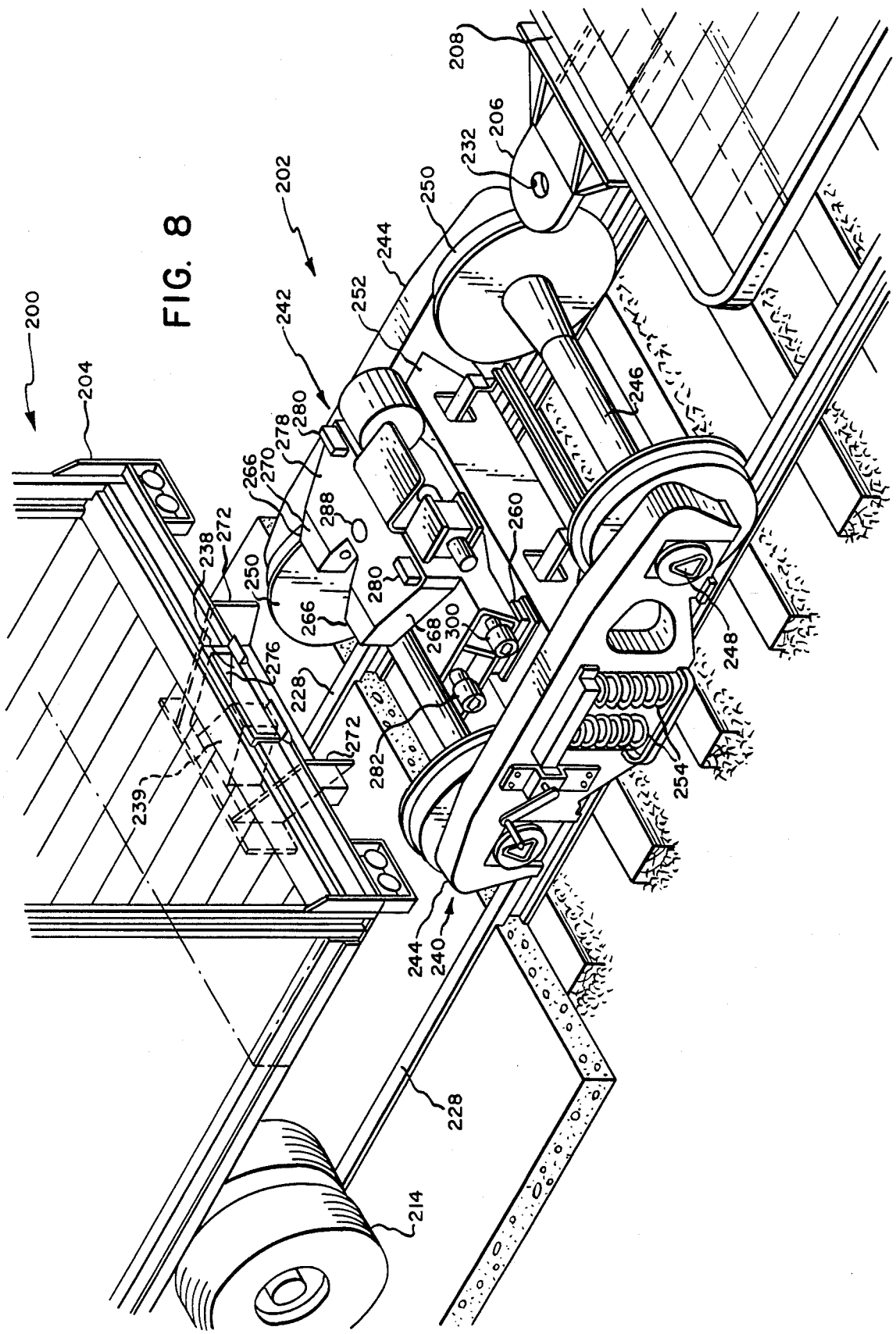

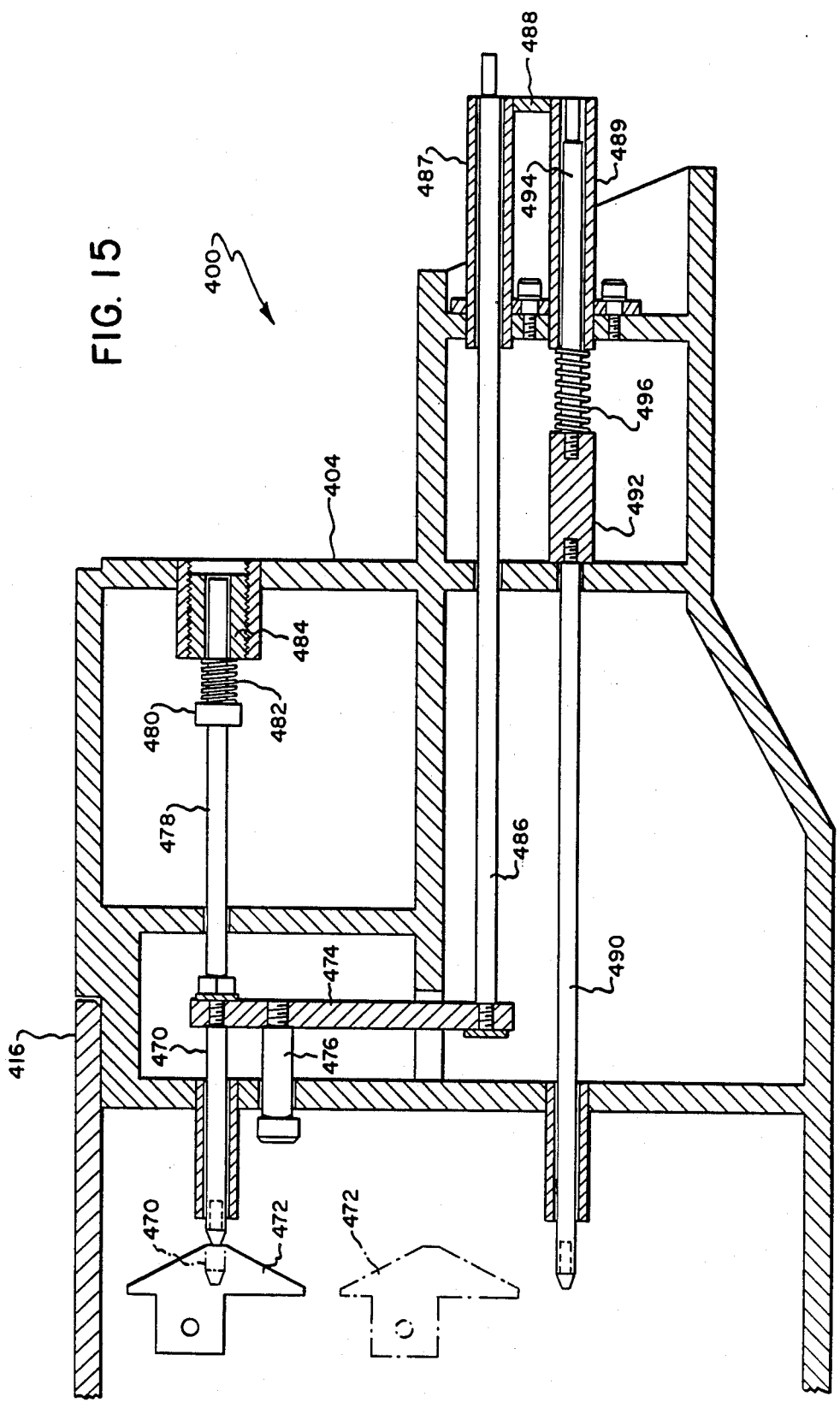

TRAIN OF HIGHWAY TRAILERS AND METHOD OF MAKING

CROSS REFERENCE TO RELATED APPLICATIONS

This application is a continuation application of U.S. patent application Ser. No. 740,650 filed June 3, 1985, now U.S. Pat. No. 4,669,391, which is in turn a continuation-in-part of U.S. application Ser. No. 469,215 filed Feb. 24, 1983, now abandoned. A related application is U.S. application Ser. No. 542,264 filed Oct. 17, 1983.

FIELD OF THE INVENTION

The present invention relates to a practical design of a train of highway trailers which are formed of novel highway trailers and railtruck assemblies and which permit flexible operations. In addition, this invention relates to a highway trailer or trailer chassis for railway and highway use which reduces the weight to be carried and therefore reduces the energy required for rail use. More specifically, this invention utilizes highway trailers which are modified to be carried over a rail track by a railtruck assembly which includes an intermodal adapter and a standard freight car railtruck. This design eliminates the need for a flat car in the intermodal rail mode thereby substantially reducing the dead load weight of the train thus reducing the energy required in the rail mode. In the highway mode, the trailer is not encumbered by excess structural weight and therefore is capable of carrying a load nearly equal to that of a standard piggyback trailer.

BACKGROUND OF THE INVENTION

In piggyback trains, the cross-country travel is by rail and local delivery is by truck. This effects savings of energy and labor. However, the dead weight of the piggyback flat cars makes up a large portion of the total railway load. It has previously been proposed to provide novel highway trailers which can be supported upon a track without the use of a piggyback flat car. One such example is shown in U.S. Pat. No. 4,202,454 issued 13 May, 1980. In this design, the highway trailer is provided with a plurality of wheel assemblies and is additionally provided with rail wheels which can be moved from a raised highway position to a lowered rail position. In addition to carrying the rail wheels and their associated axle, the highway trailer disclosed in this patent also has its weight increased by adding rail air reservoirs, rail air brake valving, rail brake shoes, rail brake beams, rail coupler actuating mechanisms, rail fixed pin coupler and rail tongue support systems, all of the various items being an integral part of the highway trailer. This additional mechanism to the highway trailer weight significantly increases its initial cost and also adds to the maintenance cost, and in effect, creates a vehicle that must be dedicated to rail service or for use near the rail thereby limiting its flexibility to be used as a general highway service vehicle. In addition, all of the above equipment which is added to the highway trailer significantly decreases its load carrying capability. In addition, the use of a single rail axle for each trailer restricts the rail use as it is customarily railroad practice and/or policy to limit freight loads to 30,000 pounds per wheel and thus the gross vehicle weight may not exceed 60,000 pounds.

Another prior art design is shown in U.S. Pat. No. 2,963,986 issued 13 Dec., 1960. In this design, a specially designed, non-standard railtruck is provided having a special adapter structure. A portion of the adapter structure can be telescoped into the rear end of a leading trailer and the fifth wheel king pin of a trailing trailer is also carried by the adapter on the railtruck. This design has failed to achieve commercial acceptance.

OBJECTS AND SUMMARY OF THE INVENTION

It is an object of this invention to utilize standard commercially available four-wheel railway trucks having a standard air brake system, the trucks being adapted to be connected to novel trailers via a unique adapter structure. This adapter structure attaches to and swivels on the railtruck bolster in the same way that a rail car would normally attach to and swivel on the truck bolster. In one form of the invention, the adapter structure is provided with two transversely spaced apart locating members or forks which are horizontally oriented and fit into a pair of transversely spaced apart sockets beneath and parallel to the rear sill of the leading trailer frame. The adapter structure also has latches which engage a latch receiving portion which may be in the form of a latch bar transverse to the rear of the trailer frame. In addition, the rear of the leading trailer is further provided with receiving means into which the forwardly extending tongue of a trailing trailer may enter and be coupled by means of a generally vertically extending shiftable coupler pin. The tonge and coupler pin allow the trailers when formed into a train to rock from side to side and fore and aft with respect to each other. The adapter frame may also be provided with anti-side sway bumpers to limit sway of both the leading and following trailer.

By utilizing the above design features, piggyback flat cars may be eliminated and the novel highway trailers of this invention become an active part of the trains, thereby decreasing the weight to be transported by rail and still further increasing the saving of combined railway highway service. When the trailers are connected end-to-end to form a train, they are pulled by a locomotive and the adjacent ends of the trailers in the train are supported by a railtruck assembly, the front end of one trailer and the rear end of an adjacent trailer being supported by a single four wheel railtruck and adapter.

To make up such a train, a trailer is backed onto an adapter unit on the railtruck. The attachment of the front end of the trailer is then affected by backing the first trailer until a tongue in the second trailer enters a socket or first receiving means in the rear of the first trailer where it is then secured by a coupler pin. Upon reaching its destination, the trailer is driven off its railway truck, and local delivery is made by pulling the trailer with a conventional highway tractor over the highway. The trailers are essentially standard highway trailers except for the modifications required for railway coupling. These modifications do not interfere with the highway use and do not appreciably add to the total weight of the highway trailer.

The foregoing features will become more apparent from a consideration of the following detailed description taken in conjunction with the accompanying drawings in which various forms of this invention are illustrated.

BRIEF DESCRIPTION OF THE DRAWINGS

FIG. 1 is a diagramatic view of a railway train consisting of a locomotive and a plurality of highway trailers.

FIG. 2 illustrates a procedure for making up a train of highway trailers.

FIGS. 7A and 7B are a fragmentary side elevation of a second embodiment showing the back end of a leading trailer. In FIGS. 7A and 7B, the front end of a following trailer in FIG. 7B and the railtruck assembly for supporting the foregoing.

FIG. 8 is an isometric view of the railtruck assembly of FIGS. 7A and 7B is position to be coupled to the back end of a leading trailer and a partial front view of a following trailer.

FIG. 15 is a section taken generally along the line 15—15 in FIG. 12.

DETAILED DESCRIPTION

In General

Figure 3:
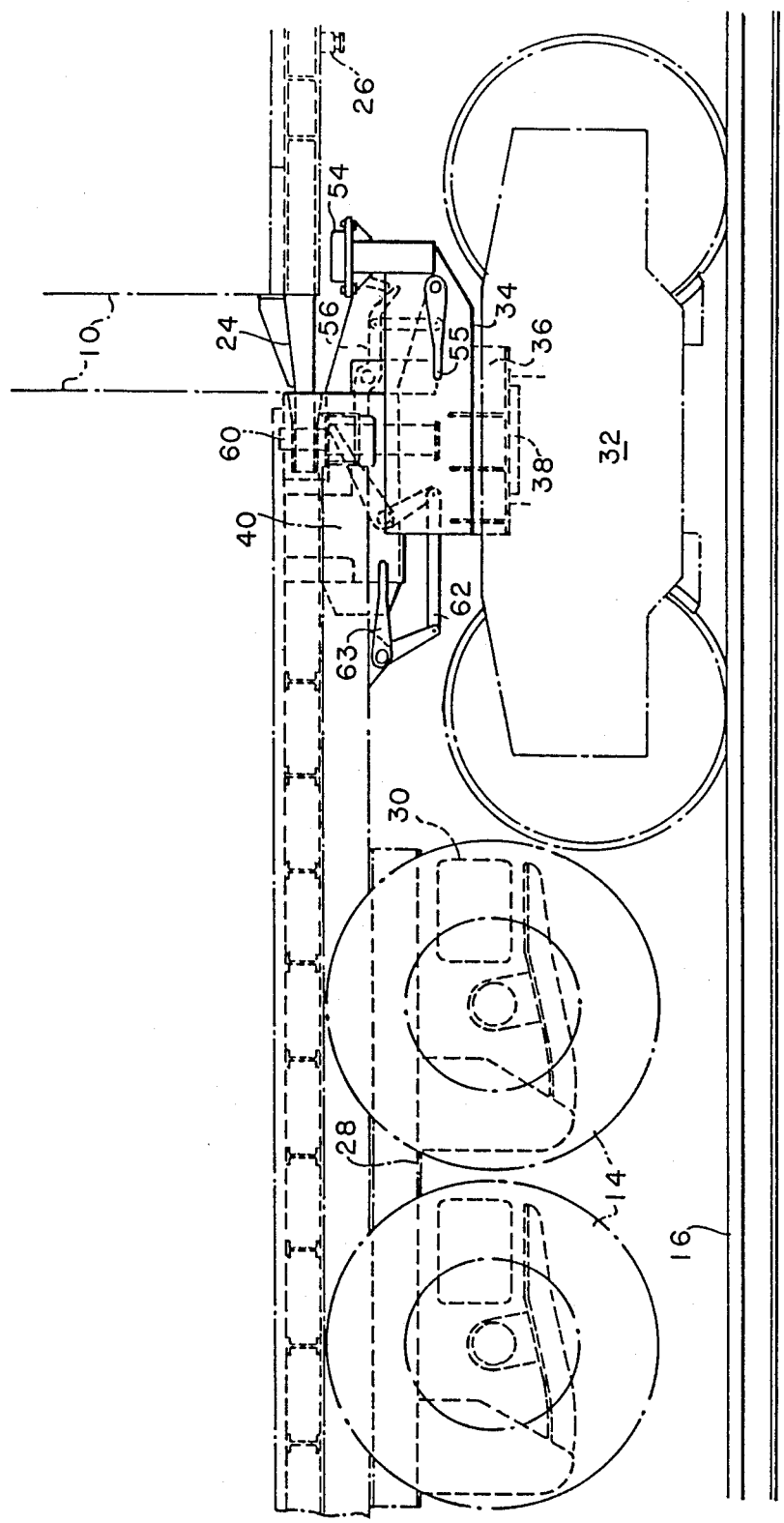
FIG. 3 is a fragmentary side elevation showing the back end of a leading trailer, the front end of a following trailer, and a railtruck assembly supporting the foregoing.

In the three embodiments disclosed in the drawings and discussed in detail below, novel highway trailers are disclosed which can be coupled to each other by railtruck assemblies for transport over rail tracks without the use of flat bed rail cars or without the use of rail wheels carried by the highway trailers. In addition, a novel method of assembling the highway trailers and railtruck assemblies into a train of highway trailers is also disclosed. In all of the various designs illustrated, more or less conventional highway trailers having modified front and rear ends are adapted to be supported on a novel intermodal adapter which is in turn supported on a generally conventional railtruck, the adapter and railtruck forming a railtruck assembly. In each of the various designs, the rear end of the leading trailer is supported generally over the center line of the bolster of the associated railtruck, and similarly, the leading end of the following trailer is also supported over the center line of the bolster. The foregoing will be more fully understood from a consideration of the following description of the three illustrated embodiments.

First Embodiment

The highway trailers of this embodiment are indicated generally at 10 and are intended to be used in a unit part of a train which will include a locomotive 12 and a plurality of trailers connected end to end. When so connected, the road wheels 14 of each trailer are supported above the tracks or rails 16. The trailers are designed for use in a unit train where all of the trailers have a similar chassis and coupling structure. The body styles of the highway trailers may differ in accordance with shipping requirements. The lead trailer in the train has at its front end a load carrying tongue 18 fixed to a special railway coupler 20 which is in turn connected to the locomotive coupler 22.

The trailers in the train are standard highway trailers, with the exception of their front and trailing ends, which are carried by adapters on standard type railtrucks equipped with standard railway type air brakes. The modifications to the highway trailers permit combined highway and railway use. At the front of each trailer, the only modification necessary is the addition of a tongue 24 which is secured to the trailer in a load carrying relationship. In practice the leading trailer as well as all following trailers will have the same tongue design.

When a trailer is transported over a highway, the front end is carried by a fifth wheel pin 26 which is removably locked to the fifth wheel plate of the usual truck tractor. When used in a railway train, the gravity load of the front end of the trailer and the braking (buff) and draft thrusts are all taken through the tongue 24 which is rigidly fixed to the front end of the trailer frame. At the back end of the trailer frame, it may be necessary to mount the road wheels 14 on a sub-frame 28 for adjustable fore-and-aft positioning. The purpose of the sub-frame 28 and the adjustable mounting for the road wheels is to permit compliance with local laws relating to highway use and/or to allow sufficient space for adaptation to the railway mode. The particular road wheels shown are supported by an air suspension 30 such as manufactured by Fruehauf, Neway or Granning so that upon release of the air pressure, the wheels are automatically retracted well above the rails sufficient to meet or exceed normal railroad rail clearance requirements. The lifting means for the road wheels in the suspension is not activated until the back end of the trailer is positioned on an intermodal adapter so that the load is carried by a standard four wheel railway truck 32, for example, Dresser model DR-1; Barber stabilized truck mod. S-2-C, or the equivalent.

Figure 4:
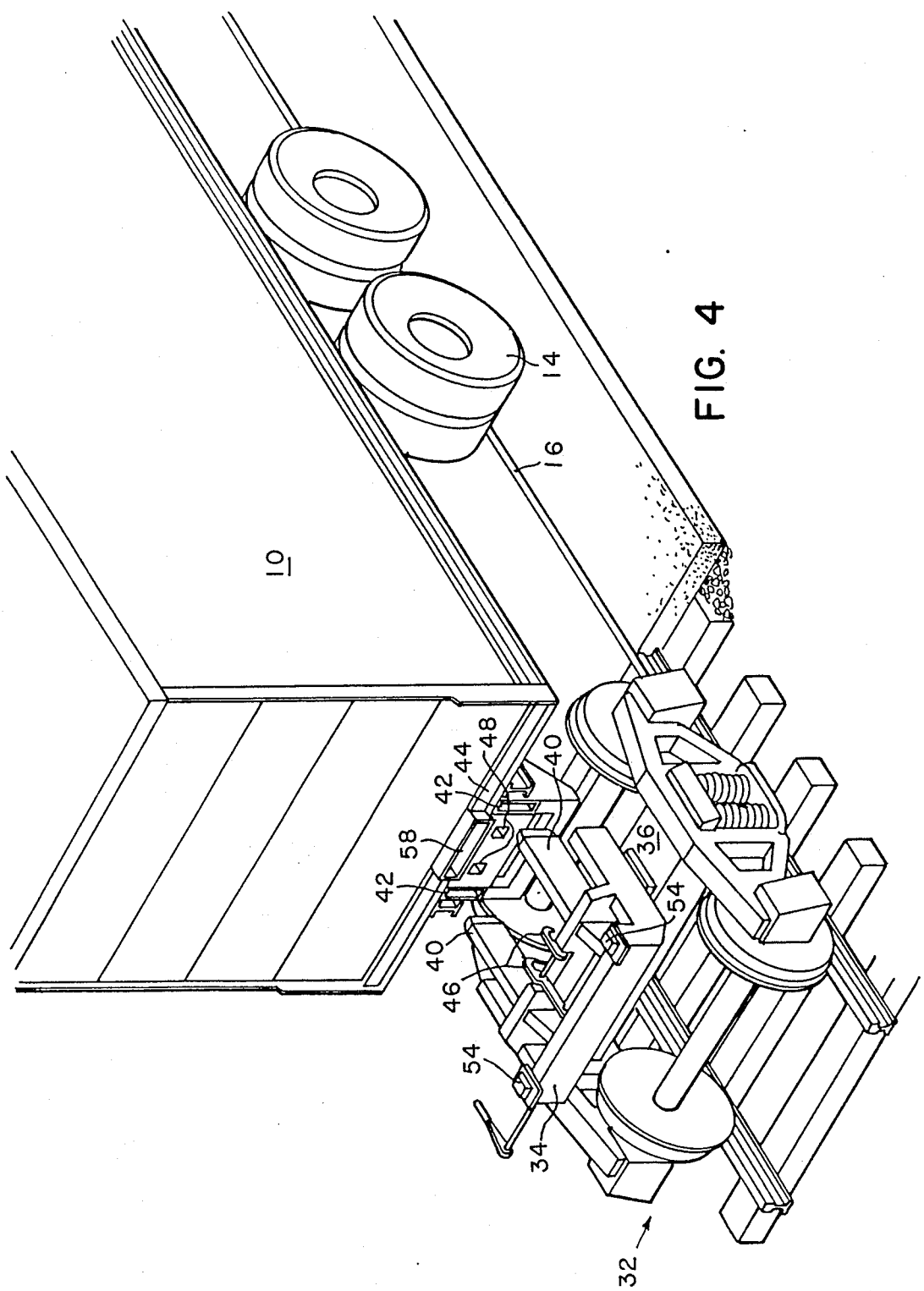
FIG. 4 is an isometric view of the railtruck assembly in position to be coupled to the back end of the leading highway trailer.
Figure 5:
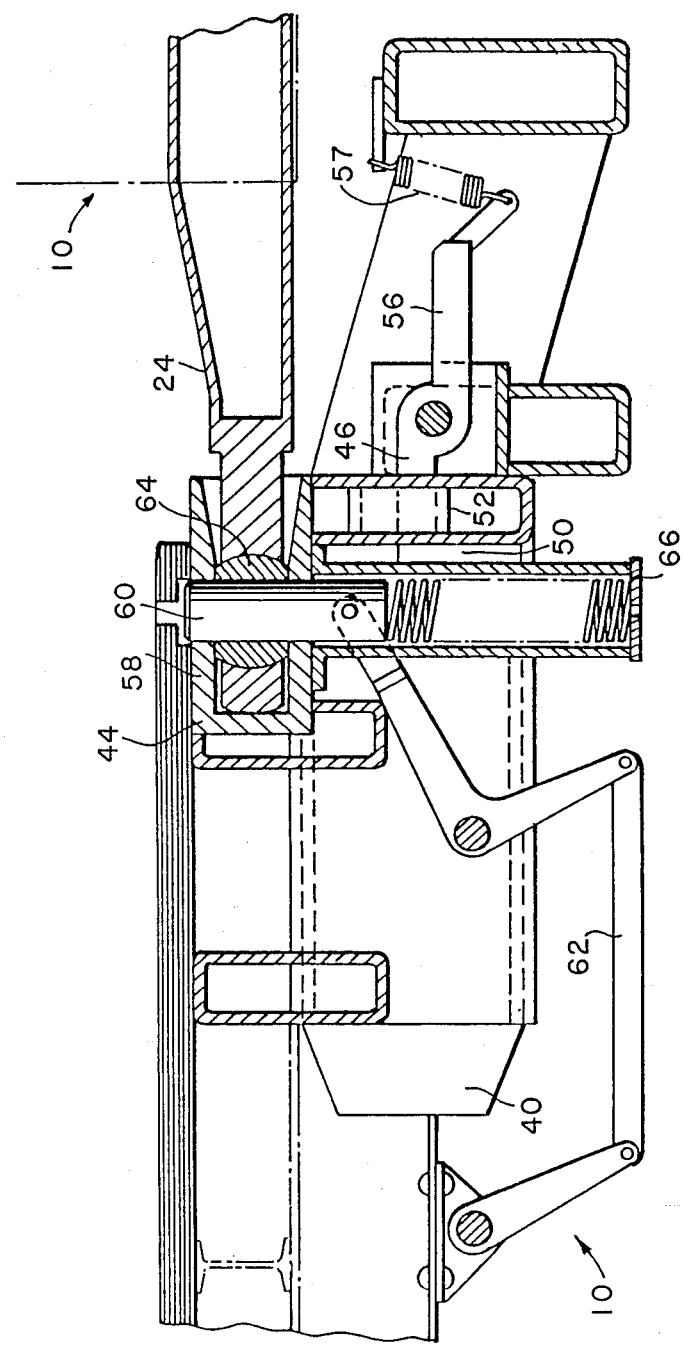
FIG. 5 is a fragmentary section along the center line of a leading and a following highway trailer coupled together.
Figure 6:
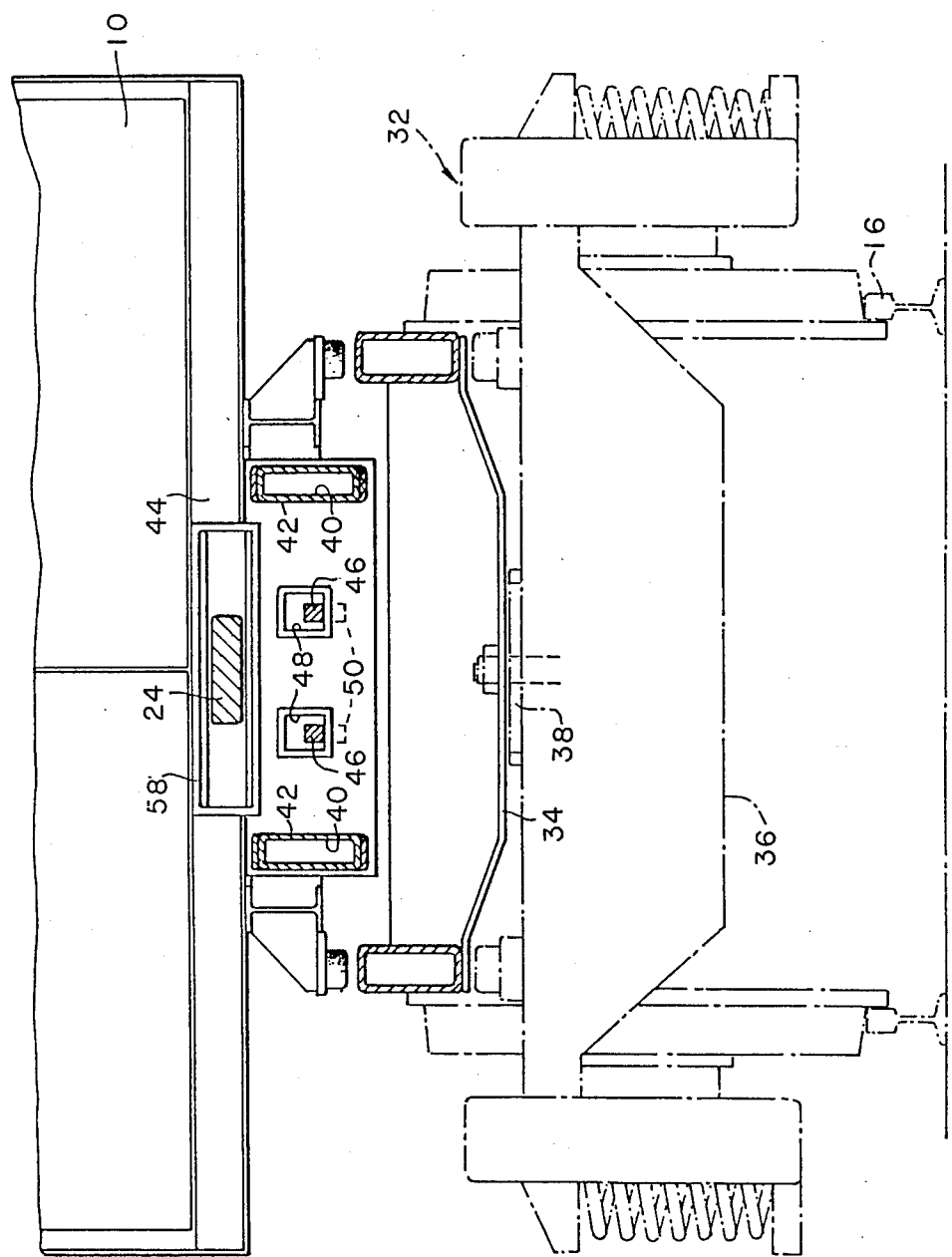
FIG. 6 is a transverse section through the rear sill of the coupling of the leading trailer of FIG. 5.

The coupling between the truck 32 and the back end of the leading trailer is through an intermodal adapter or adapter frame 34 which is rotatably supported on the centerplate bowl of the bolster 36 by the centerplate (thrust bearing) 38 of the adapter frame. The adapter frame 34, as shown in FIG. 4, has load carrying locating members or forks 40 which extend through coupling sockets or second receiving means 42 in the rear sill 44 of a leading trailer. The adapter frame also has latch members 46 which extend through openings 48 in structure below the rear sill 44. As used in this specification the sill includes the rear transverse trailer frame member and the socket structure which receives the following trailer tongue. When the forks 40 are fully received in the sockets 42, the adapter frame is solidly latched against the rear sill of the lead trailer by the cooperation of the forward ends 50 of the latch members 46 with a latch bar 52.

The gravity load of the back end of the leading trailer is carried by the forks 40 and is transferred by the forks to the centerplate 38. The adapter frame also has sway pads 54 for limiting side sway of the following trailer. A handle 55 and linkage mechanism 56 are provided for manually pivoting the latch members 46 clear of the latch bar 52, thereby releasing the latches from holding the adapter frame against the rear sill of the back end of the leading trailer. A spring 57 causes the latches to engage the latch bar when the leading trailer is assembled onto the adapter. In the rear sill 44 there is also a first receiving or socket portion 58 which is adpated to receive the tongue 24 of the following trailer. Spaced below the socket 58 is a king pin or coupler pin 60 which may be held in either a lowered position or a raised position. The pin 60 is normally biased to its raised position by spring 66, but may be moved to its lowered position by linkage 62 and handle 63. When the tongue is fully received within the socket, the axis of a self aligning bearing 64 in the tongue lines up with the axis of the coupler pin 60 so that upon release of the linkage 62, which has been holding the coupler pin down, the king pin is urged upwardly by a spring 66 into position in the self aligning bearing 64 and positively couples the tongue 24 of the following trailer to the rear end of the leading trailer. In this connection, it should be noted that the socket has spaced apart vertically aligned apertures which receive the coupler pin so that when the trailers are assembled to each other, the coupler pin is only in shear. The socket 58 has enough clearance to allow pivoting and rocking of the tongue 24 relative to the socket.

The center line of the king pin or coupler pin 60 and the axis of the centerplate 38 lie on the same vertical axis. Thus, the entire gravity load of the back end of the leading trailer and of the front end of the following trailer is transmitted from the rear sill 44 through the forks 40 and adapter frame 34 to the centerplate 38 and then to the bolster 36 of the railtruck 32.

Making up a train is illustrated in FIG. 2. (1) A highway trailer 10 is brought to the makeup site by a truck tractor (not shown), the trailer being positioned on a loading pad 68 in alignment with the rails of loading track 70. (2) A railtruck assembly (railtruck 32 and adapter 34) is brought from a spur track 72 into a loading position on the rails of the loading track 70 directly behind the previously mentioned highway trailer. (3) The first mentioned trailer is then backed toward the railway truck assembly until the forks 40 on the railtruck assembly are received within sockets 42 on the trailer. The latches 46 are latched over the latch bar 52 on the trailer when the fully assembled position is attained and thus the back of the trailer is securely latched to the railtruck assembly. The air is then released from the trailer suspension 30 and the trailer road wheels are lifted above the track 70. The leading highway trailer 10 and assembled railtruck assembly are now backed as a unit into a following trailer having its front end supported by its retractable landing gear, the tongue 24 of the following trailer being received in socket 58 in the leading trailer and the king pin or coupler pin then being raised to complete the coupling of the back end of the leading trailer to the front end of the following trailer and to the railtruck assembly. Upon retracting of the landing gear for the following trailer and connecting the air brake lines to the brakes for the truck, the trailers are ready for railway use. A complete train may be made up by adding trailers one by one as described, and individual trailers may be removed one at a time by the reverse procedure. Other procedures may also be followed for making up or disassembling a train. For example, a winch 74 may be utilized to bring the railtruck assembly to the trailer rather than by bringing the trailer to the railtruck assembly.

This invention provides a unique vehicle requiring minimal modifications of conventional highway semitrailers and utilizing commercially available components, including a two-axle railtruck of proven type and an air suspension system for the trailer. The unique adapter assembly allows coupling to the semi-traler and prevents swaying of the trailers in railway operation over rough track, around curves, and the like. The truck trailers, when used for highway operation, are not burdened with extra weight which would cause them to pay a penalty in energy consumption or load carrying ability, and yet they are quickly and easily adaptable to railway operation. The support of the trailers during railroad operation is substantially the same as the support of freight cars on conventional railtrucks.

Second Embodiment

Figure 9:
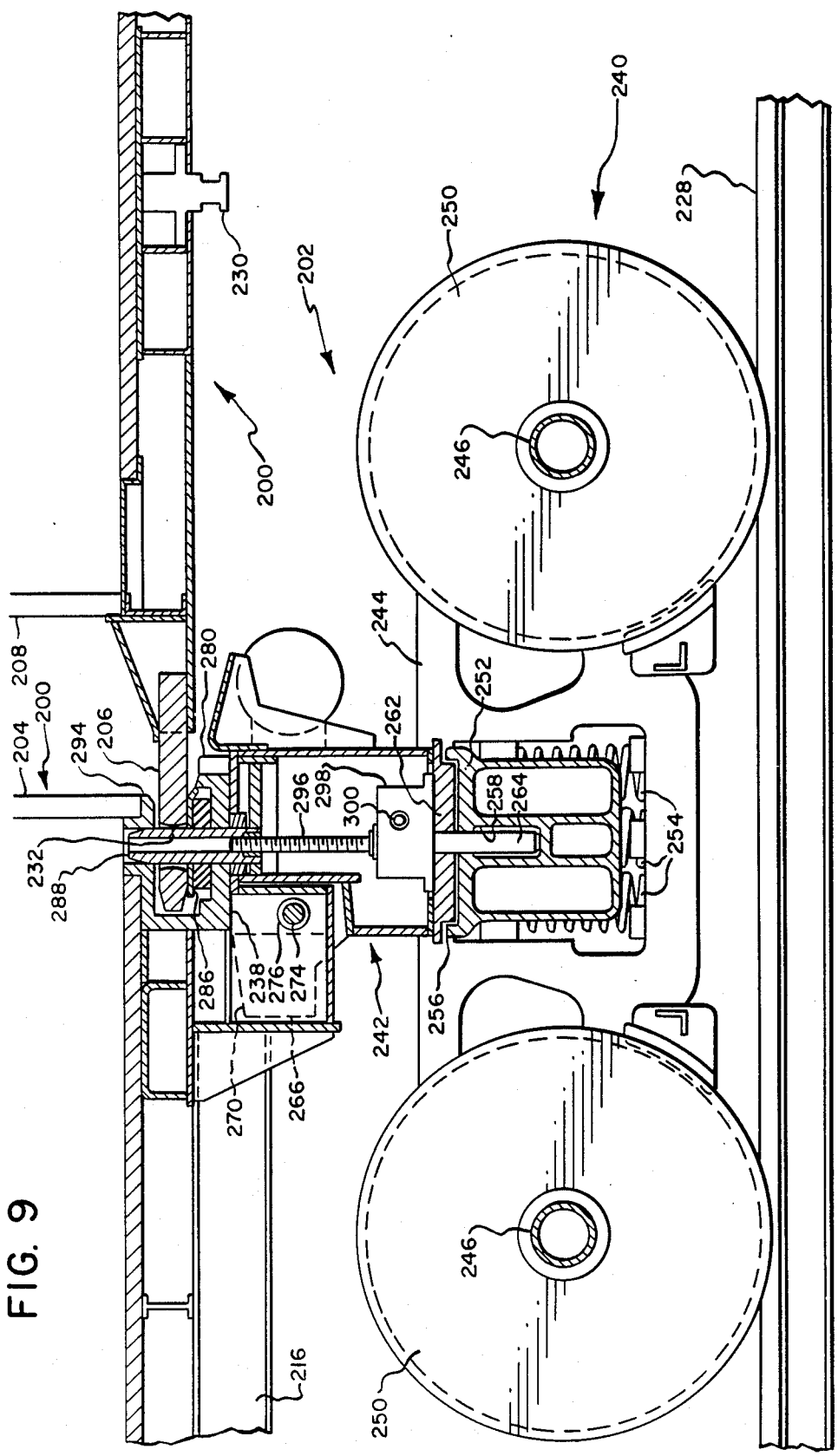
FIG. 9 is a fragmentary section along the centerline of a leading and a following trailer and the associated railtruck assembly when the trailers are coupled together.
Figure 10:
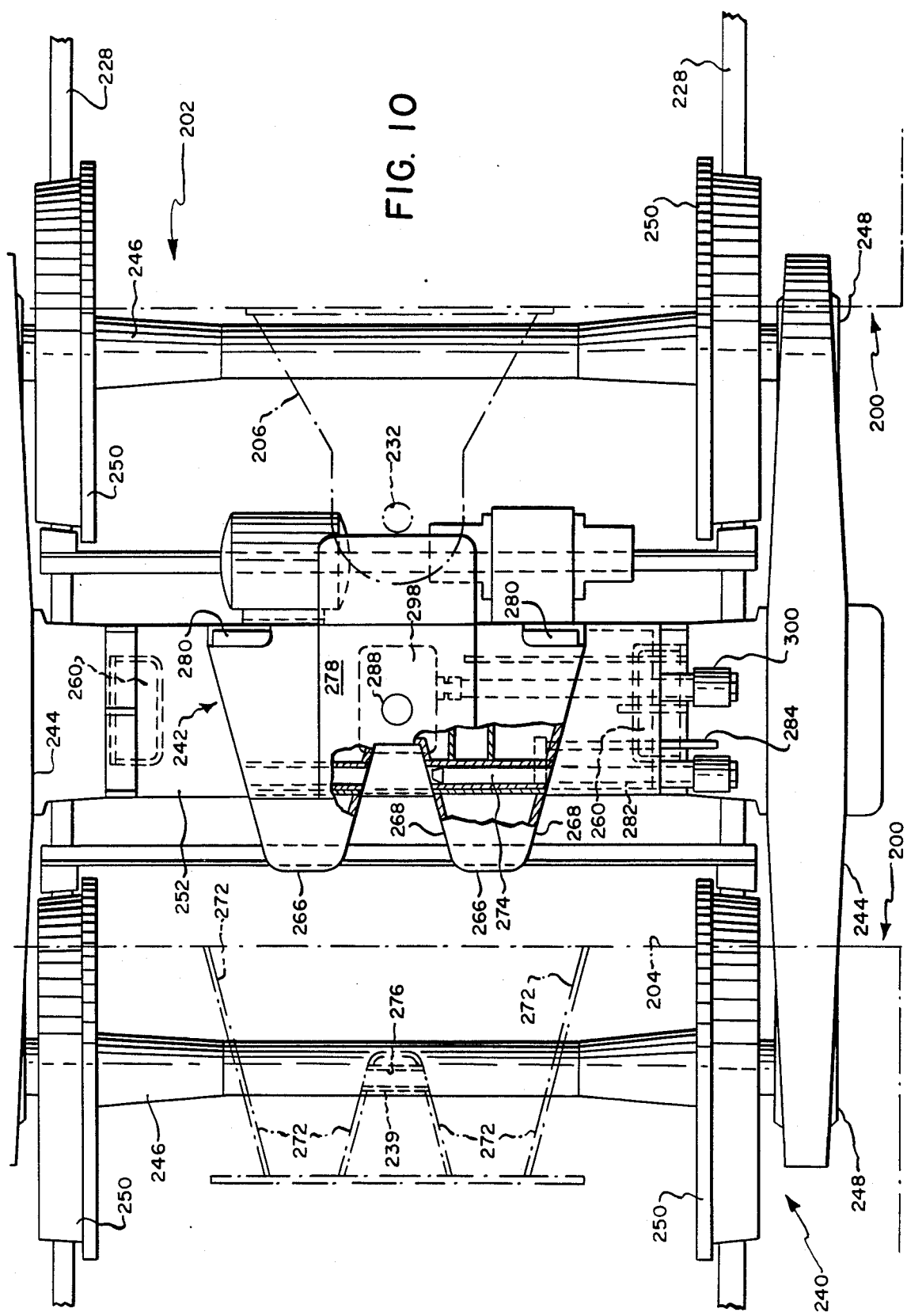
FIG. 10 is a top plan view of the railtruck assembly and of the coupling members on the highway trailers (shown in phantom).
Figure 11:
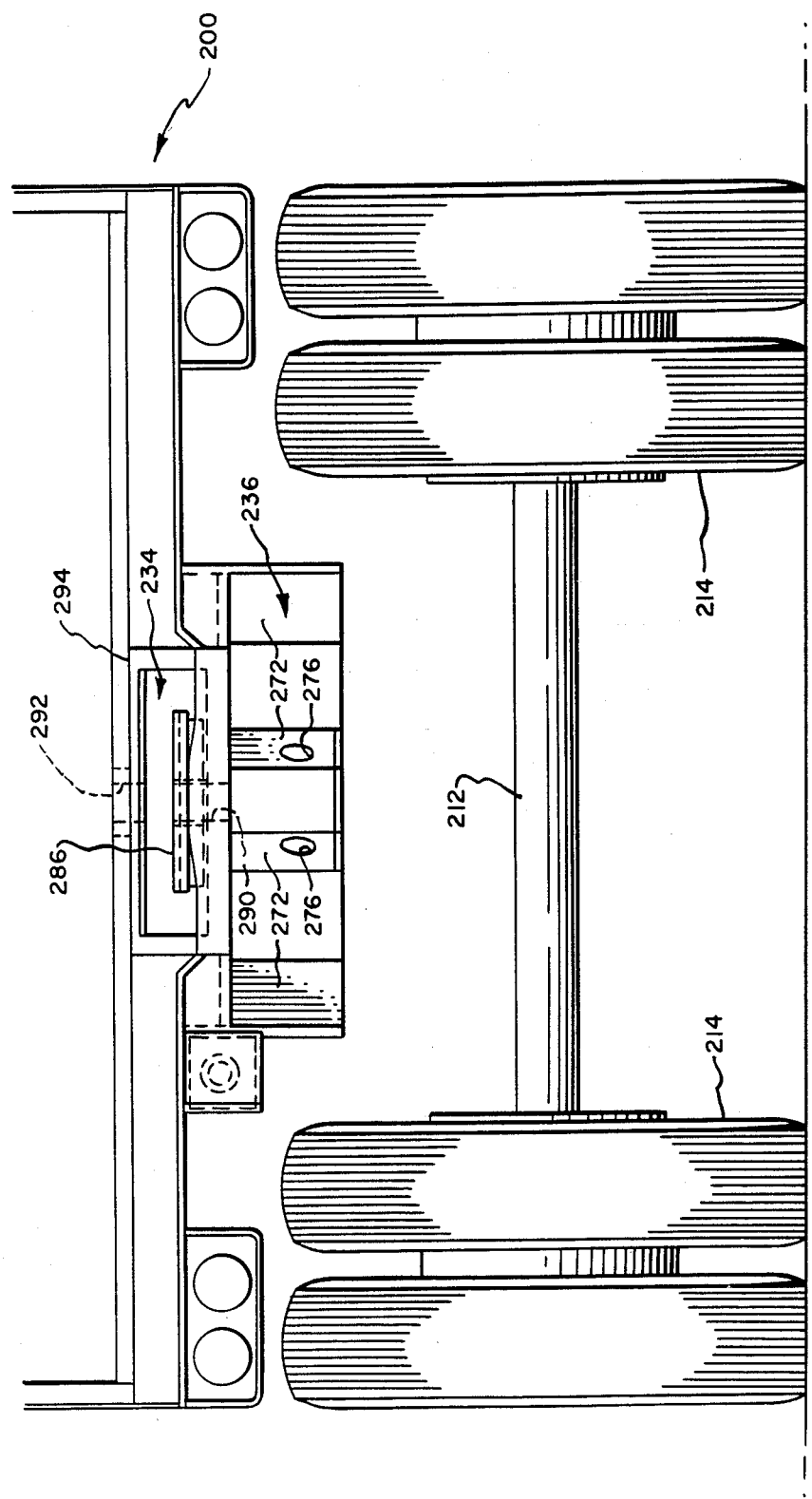
FIG. 11 is a rear view of the leading trailer illustrated in FIG. 9.

Referring now to FIGS. 7-11, a second embodiment of this invention is illustrated. This embodiment, like the first embodiment, consists of a plurality of highway trailers, indicated generally at 200, and a plurality of railtruck assemblies, indicated generally at 202, which can be assembled into a train of highway trailers. When so assembled, the leading trailer may be connected to a locomotive, or to a freight car drawn by a locomotive. With reference to FIG. 9, it can be seen that the rear end portion of leading trailer 204 is supported on a railtruck assembly 202, and the tongue 206 of a trailing or following trailer 208 is supported on the same railtruck. A second following trailer will be connected to the first following trailer in the same manner, and so on. The final following trailer of the train of trailers will have its rear end supported by another railtruck assembly 202.

Figure 7B:
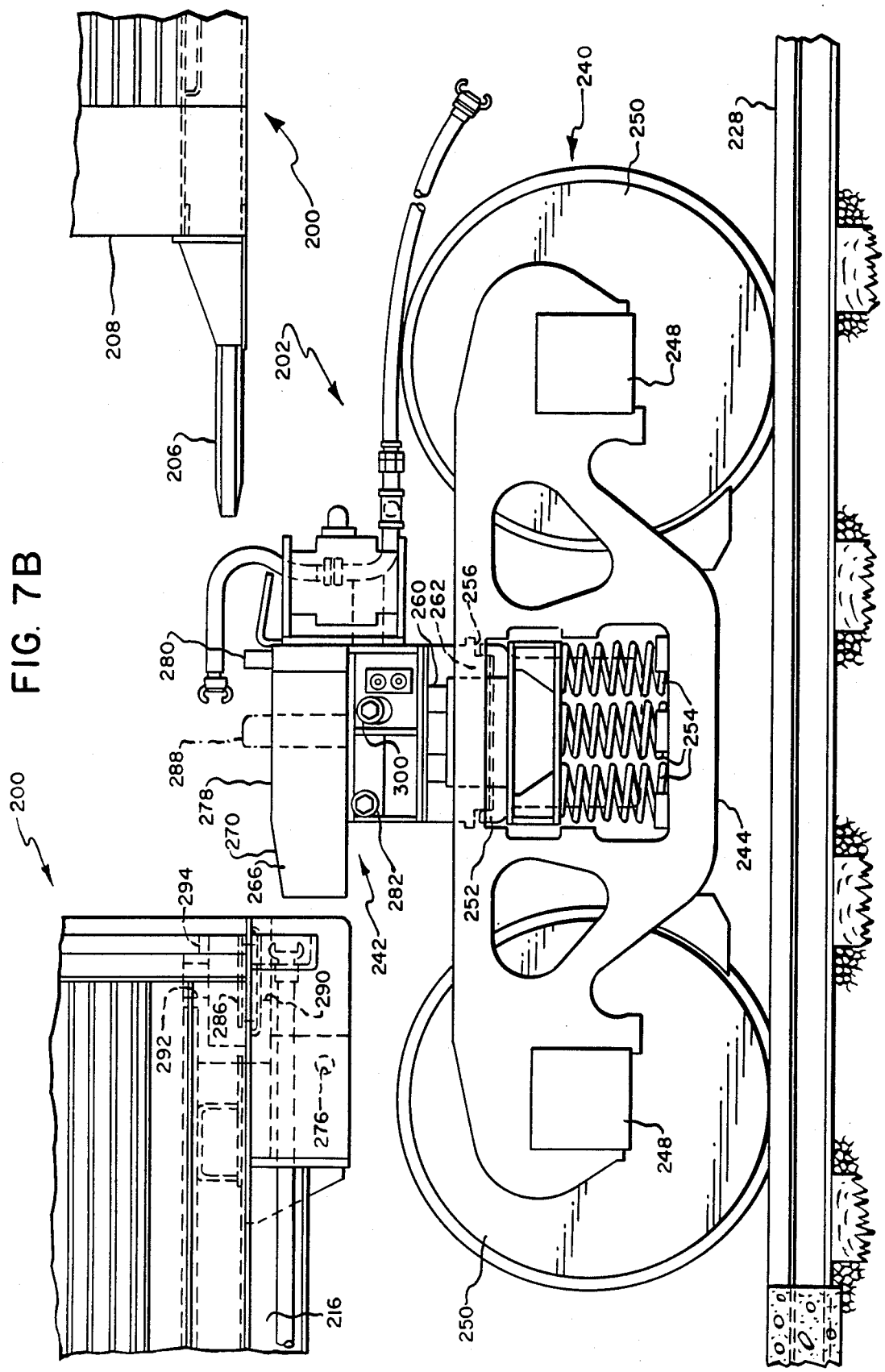

The trailers are designed for standard highway use as well as for use as a train of highway vehicles when in the rail mode. Each trailer includes one or more highway wheel assemblies, indicated generally at 210, each highway wheel assembly consisting of an axle 212 and road wheels 214. The highway wheel assemblies, two being shown in FIG. 7A, are in turn connected to the main frame 216 of the trailer by a sub frame 218 and wheel support means, indicated generally at 220, each of the wheel support means including brackets 222 fixed to a portion of the subframe which can be moved in a fore-and-aft direction, pivoted beams 224, and an air suspension 226. The particular road wheels shown are supported by an air suspension 226 such as that manufactured by Fruehauf, Neway or Granning so that upon application of air pressure to a lifting cylinder and release of air pressure from the load-carrying air springs, the wheels are retracted well above the rails sufficiently to meet or exceed normal railroad rail clearance requirements, and are locked in the raised position by a mechanical lock to prevent accidental lowering while in the rail mode. The lifting means for road wheels in the suspension is normally not activated until the back end of the trailer is positioned on a railtruck assembly, and when activated the road wheels of each trailer are supported above track rails 228. However, the air spring lifting mechanism also has a provision for raising the trailer body above normal floor height to facilitate its assembly to a railtruck assembly under conditions of uneven pavement.

The sub-frame 218 is utilized as it may be necessary to reposition the road wheels 214 longitudinally with respect to the main frame 216 of the associated trailer to have a position which will prevent interference between the railtruck wheels and the highway wheels. Another purpose of the sub-frame 218 is to permit compliance with local laws relating to highway use.

The highway trailer suspension is to a large part conventional and thus each highway trailer can be readily adapted to highway use. To this end each trailer is provided with a fifth wheel king pin 230 which can be removably locked to the fifth wheel plate of a conventional truck tractor.

As previously noted, each trailer is provided with a tongue 206, the rear portion of which is secured to the main frame of the trailer in a load carrying relationship. The forward end of the tongue is provided with an hour-glass shaped aperture 232. The provision of a tongue 206 and the necessary structural reinforcements for the tongue stresses is the only major modification necessary to the front end of a more or less conventional highway trailer. When the trailers are assembled into a train of highway trailers the gravity load of the front end of the trailer and the braking (buff) and draft forces are all taken through the tongue.

In order to utilize the highway trailers in a train it is also necessary to modify the rear end of each trailer. Thus, the rear end of each trailer is provided with first and second receiving means, indicated generally at 234 and 236, respectively. The first receiving means 234 is capable of receiving the forward apertured end portion of the tongue of a following trailer. The second receiving means is disposed below the first receiving means and is separated from the first receiving means by sill 238 which is capable of supporting the rear end of its trailer as well as the front end of the following trailer. In addition, the rear end of the trailer is also provided with a latch receiving portion 239. The details of the first and second receiving means, as well as the latch receiving portion, will be brought out below.

Each railtruck assembly consists of two principal sub-assemblies, the first sub-assembly being a conventional railtruck, indicated generally at 240, and the second sub-assembly being a novel intermodal adapter, indicated generally at 242. As is conventional, each railtruck 240 includes a pair of side frames 244 supported on a pair of axles 246 by bearing assemblies 248. The axles in turn carry rail wheels 250. A transversely extending bolster 252 is supported on the side frames 244 for rocking movement by springs 254, the bolster in turn having a centerplate bowl defined by a circular rim 256. The centerplate bowl is in turn provided with a vertically extending aperture 258 concentric with the rim 256. Each railtruck is provided with a shoe-type "Unipac" truck-mounted brake system as manufactured by Buffalo Brake Beam Co., Lackawanna, N.Y., U.S., or the equivalent. In addition, an air brake operating system is also provided. The upper surface of the bolster is provided with transversely spaced apart upwardly facing elastomeric constant contact side bearings 260 such as those manufactured by A. Stucki Co. These side bearings are always in contact with transversely spaced apart lower surfaces of the adapter 242 and serve to limit hunting and flange-climbing of the railtruck as it travels on the rails.

The coupling between the railtruck 240 and the back of the leading trailer is through the intermodal adapter 242 which is rotatably supported on the railtruck bolster 252 by its centerplate 262 (which acts as a thrust bearing) and centerplate pin 264. The adapter structure, shown in FIG. 8 has forwardly extending locating means in the form of transversely spaced apart locating members or forks 266 which are adapted to extend into the second receiving means below the rear trailer sill 238. These forks, and the second receiving means are shaped with a generous taper to effect the "gathering" of the forks into the second receiving means. As can be seen each of the forks 266 has sidewalls 268 which taper or converge in the forward direction. In addition, each fork has a top surface 270 which is inclined forwardly and downwardly and which may act as a ramp surface when contacted by the lower rear edge of the sill 238 when making up a train. The second receiving means 236 which receives the locating means 266 also has sidewalls 272 which have a corresponding taper. The center sidewalls 272 form the latch receiving portion or nose piece 239 which is snugly received between the forks 266 when fully assembled, and which also acts as a centering locator. The adapter structure 242 also has a horizontally disposed latch pin or bar 274 which passes through an opening 276 in the latch receiving portion. When the forks 266 are fully received in the second receiving means, the adapter structure is solidly latched against the rear sill 238 by the operation of latch pin 274 through the opening 276.

The adapter 242 is provided with support means in the form of an upwardly facing load carrying surface 278 generally concentric with the pins 264 and 288, there being a pair of transversely spaced apart stops 280 to the rear of surface 278. When the parts are fully assembled, the stops are contacted by the rear facing surface of the sill 238 and the trailer sill of the leading trailer is supported on the surface 278, which may be in the form of a removable wearplate, the load being transferred by the adapter structure to the bolster.

The latch pin or bar 274 is provided with a tapered leading end and is internally threaded. A threaded shaft 282 is journaled within the frame of the adapter and rotation of the shaft will cause the pin to be either extended or retracted. Latch indicator means in the form of a rod 284 is secured to the pin 274 and serves to indicate whether the pin is in its latching position.

When the tongue 206 is fully receiving within the first receiving means, it rests upon an apertured elastomeric pad fastened to the inner lower surface of the sill 238. This elastomeric pad is in the form of a sandwich consisting of a lower metal plate which is fastened to said inner lower surface and an upper metal plate upon which tongue 206 rests when it is within the first receiving means. Between these metal plates and bonded to them is a resilient elastomeric material which will allow the tongue of the following trailer to rock and sway relative to the leading trailer while the train is traveling along rough or uneven trackage.

When the adapter locating members 266 of the intermodal adapter are fully received and latched into the second receiving means 236 of the leading trailer 204 and tongue 206 of the following trailer 208 is fully received in the first receiving means 234 of the leading trailer, a coupler pin 288 carried by the adapter for vertical movement is raised through aperture 290 in sill 238, through the aperture in elastomeric pad 286, and finally through the aperture 292 in the upper wall 294 of the first receiving means. Coupling pin 288 is raised from within the adapter structure by a screw 296. The screw 296 is caused to be rotated by a gearbox 298 which is operated by drive shaft 300. By reversing the power to the drive shaft, the pin may be lowered for uncoupling. The centerline of coupler pin 288 and the axis of the centerplate pin are concentric. Thus, the entire gravity load of the rear of the leading trailer and of the front of the following trailer is transmitted from the rear sill 238 through the adapter 242 to the bolster 252 of railtruck 240 in substantially the same conventional manner as the weight of a freight car is supported by its railtrucks.

The train of this embodiment is made up in the same manner as the train of the first embodiment. While only one body style of trailer has been illustrated it should be obvious that the body styles of the trailers may differ in accordance with shipping requirements.

Third Embodiment

Referring now to FIGS. 12–15, a third embodiment of an intermodal adapter is illustrated in these figures, the intermodal adapter being indicated generally by reference numeral 400. In addition, a portion of a highway trailer is indicated in phantom lines in FIG. 12 for the purpose of showing how the intermodal adapter is connected to such a highway trailer. The highway trailer is in turn indicated generally by reference numeral 402. The adapter has various components supported by a principal welded frame indicated generally at 404. While not illustrated in FIGS. 12–15, the intermodal adapter is adapted to be supported upon a railtruck of the type shown in the previous figures, for example FIG. 9. To this end, the adapter is provided with a centerplate 406 and centerpin 408 which are adapted to be received by the centerplate bowl of a bolster in the same manner as indicated in FIG. 9. In addition, the bolster is provided with constant contact side bearings which are adapted to contact transversely spaced apart portions 410, 412.

The welded frame assembly 404 is generally rectangular in cross section, the centerplate 406 being secured to a lower central portion 414 disposed between the transversely spaced apart portions 410, 412. Support means capable of supporting a highway trailer is incorporated into the frame, the support means being an upwardly facing load carrying surface 416. Disposed to the rear side of the load carrying surface are a pair of transversely spaced apart stops 418, 420. Extending to the rear of the principal portion of the welded frame and between the stops 418 and 420 is a ramp 422, the upper surface of which is inclined in a forward upward direction.

The load carrying surface 416 is provided with a central aperture through which a coupler pin 424 may extend. The lower end portion of the coupler pin is welded or otherwise rigidly secured to a base plate 426. The base plate is generally circular and is received within a vertically extending tubular member 428 which is received within the welded frame 404. In order to keep the base plate 426 from rotating within the tubular member 428, a vertically extending slot 430 is provided within one wall of the tubular member, and a key 432 is fixed to the base plate and passes through the slot.

Figure 12:
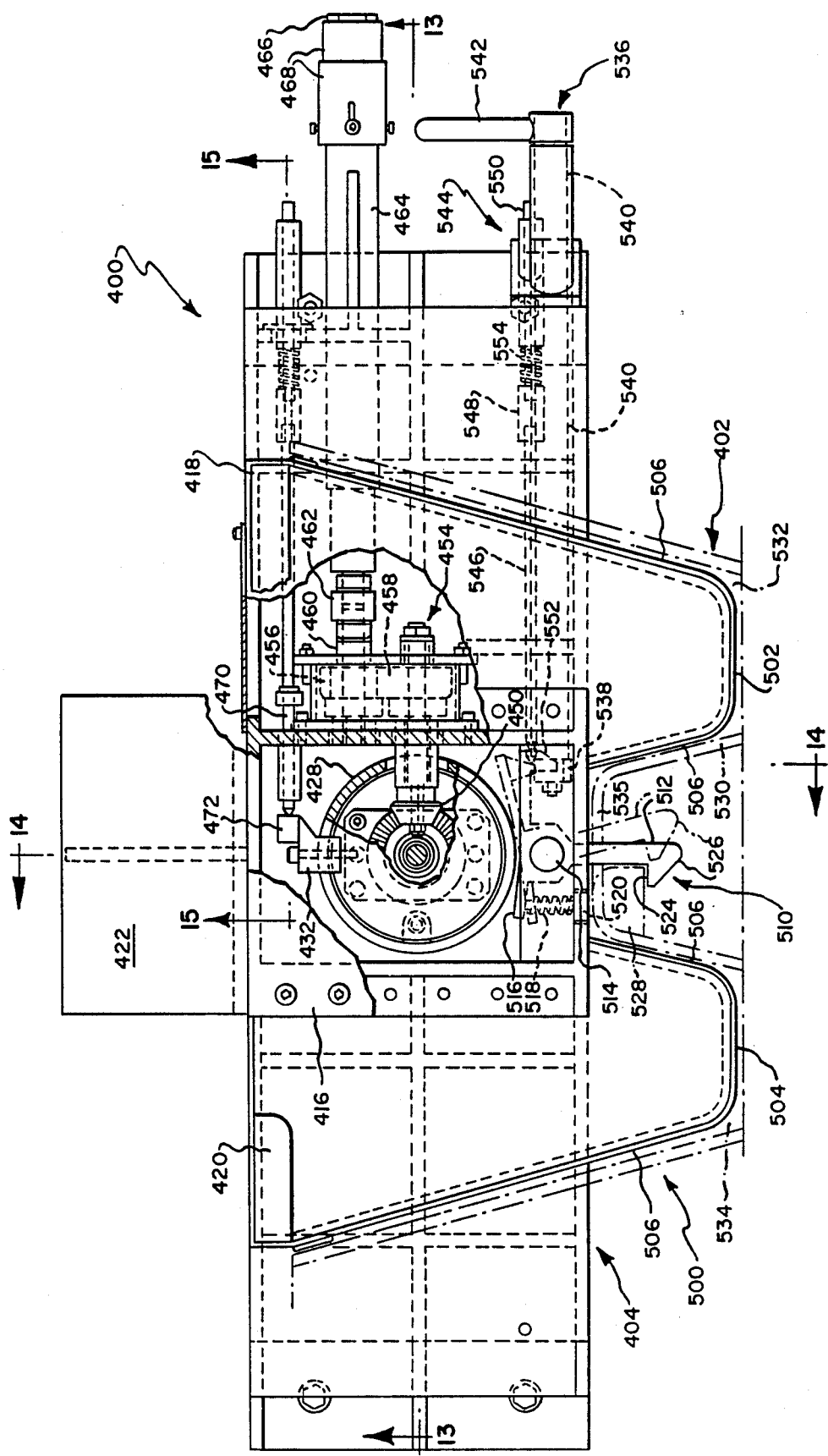
FIG. 12 is a plan view of a third embodiment of an adapter for a railtruck, parts being broken away, this view also illustrating a portion of a highway trailer in phantom.
Figure 13:
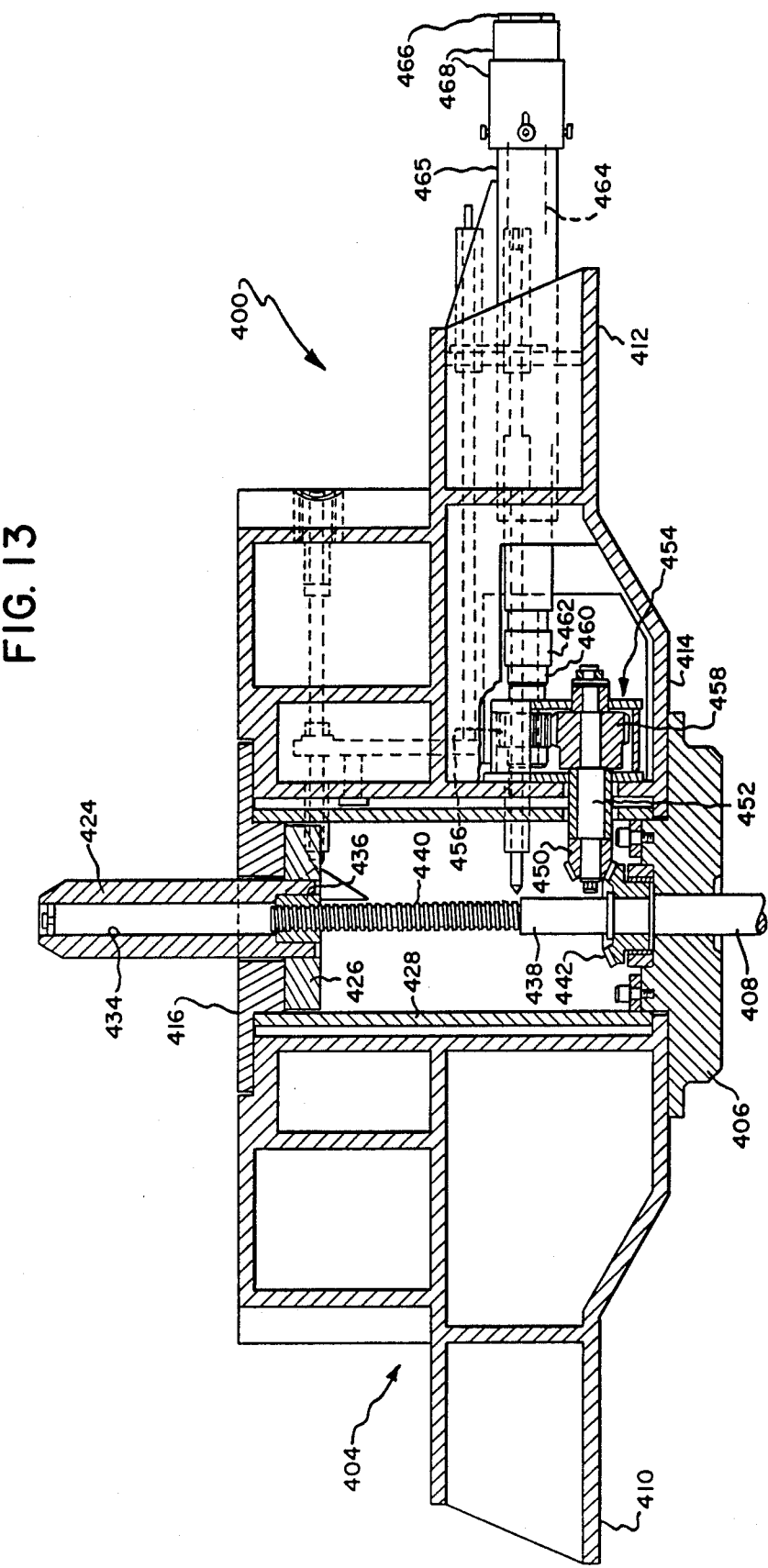
FIG. 13 is a section taken generally along the line 13—13 in FIG. 12.

The coupler pin 424 is provided with a central longitudinal bore 434 and a threaded insert 436 is fixed to the lower end of the coupler pin in coaxial alignment with the bore 434. A coupler pin drive shaft or jack shaft 438 is provided with acme threads at one end 440, the acme threads in turn being received within the threaded insert 436. The other end of the shaft 438 has a drive gear 442 keyed thereon, the drive gear in turn having a machined surface which is journaled within a bushing 444 (FIG. 14), which is force fit into a gear support plate 446. the gear support plate is in turn secured to the top of the centerplate 406 by fasteners 448. At this point, it can be seen that if the gear 442 is caused to be rotated, the coupler pin will be moved upwardly and downwardly. To this end, a pinion gear 450 (FIG. 13) is mounted on the output shaft 452 of a gear box assembly indicated generally at 454, the gear box assembly in turn, as shown in FIG. 12, including drive and driven gears 456, 458, respectively, the driven gear 458 also being secured to the output shaft 452 in driving relationship. The input shaft 460 of the gear box is in turn coupled through coupling 462 to a coupler pin operating shaft 464 which is suitably journaled in journal 465 of the welded frame 404. One end of the shaft 464 projects outwardly of the frame 404 and is provided with a suitable surface, such as a hex surface 466, for driving the shaft. The hex surface is normally covered by a drive shaft locking collar 468 in sliding relationship to journal 465 which can be shifted to the left as viewed in FIG. 13 when the shaft 464 is to be rotated to move the coupler pin up or down. It should be noted, at this point, that the shaft 438 and its various gears and drives can be considered to be a screw jack.

It is desirable to know the location of the coupler pin when the intermodal adapter is secured to two highway trailers, and to this end coupler pin indicating means are provided. The coupler pin indicating means are best shown in FIG. 15 and include a push rod 470 which is suitably journaled for sliding movement within the frame 404, one end of the push rod being contacted by an indicating operating cam 472, as can best be seen in FIG. 12, which is secured to the key 432 and extends to one side thereof. The other end of the push rod is received within an indicator rod support 474. The indicator rod support is in turn supported for transverse shifting movement by, in addition to the push rod 470, shoulder bolt 476 and indicator guide rod 478. A collar 480 is fixed to the indicator guide rod 478 and a compression spring 482 is disposed between the collar and a bushing 484 which receives the end of the indicator guide rod 478, the compression spring normally biasing the nose end of the push rod into engagement with the cam 472, or, in the event that the cam is spaced away from the push rod 470, to a left hand position as indicated on FIG. 15 by dotted lines. A first indicator or up rod 486 is suitably secured to the lower end of the indicator rod support 474 and passes through the upper guide bushing 487 of a guide body assembly 488, the right hand portion of the up indicator rod being adapted to project outwardly of the upper guide bushing 487 when the coupler pin 424 is in its raised position, this being indicated by the position of cam 472 in FIG. 15.

It is also desirable to known when the coupler pin is in its fully lowered position and to this end the coupler indicator means also includes a second or down indicator rod 490 which passes through suitable apertures and bushings in the frame 404, the right hand portion being secured to a connector or shoulder piece 492. A down indicator rod extension 494 passes through the lower guide bushing 489 of the indicator guide body assembly 488. Another compression spring 496 is disposed between the shoulder piece 492 and one end of the bushing 489 and normally biases the down indicator rod 490 to its left hand position as shown in FIG. 15. When the coupler pin 424 is in its fully lowered position, the cam 472 will contact the left hand end of the down indicator rod 490 and bias it to the right hand position where it will extend beyond the guide bushing 489 to indicate that the coupler pin is in its lowered position.

Figure 14:
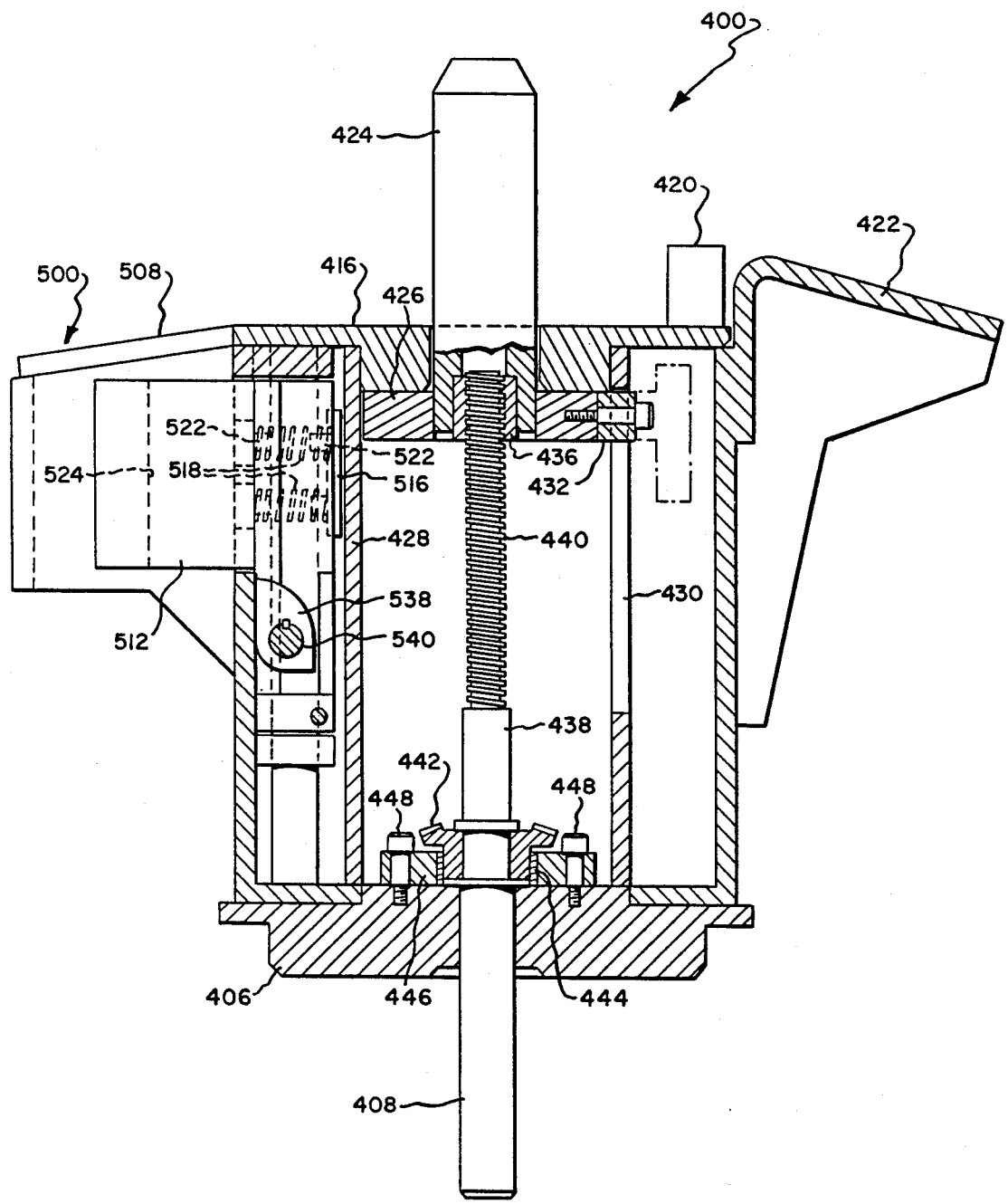
FIG. 14 is a section taken generally along the line 14—14 in FIG. 12.

The welded frame 404 of the intermodal adapter includes, as best seen in FIG. 12, forward locating means indicated generally at 500. The forward locating means are essentially of the same configuration as that shown in FIGS. 7–10 and thus include two transversely spaced apart locating members 502, 504, each of which has two converging sidewalls 506 and a forwardly and downwardly extending upper surface 508 (FIG. 14). The sidewalls and upper surface locate the second receiving means, shown in phantom lines in FIG. 12, of a highway trailer as the highway trailer is backed into its assembled position relative to the adapter.

A somewhat different form of securing means is provided in this embodiment for securing the adapter 400 to the highway trailer and to maintain the locating members 502 and 504 within the second receiving portion of the trailer in their assembled position. To this end, the securing means includes a latch assembly on the adapter, the latch assembly being indicated generally at 510. The latch assembly includes a pivoted latch 512 supported by a vertically extending pivot pin 514. The latch is normally spring biased to the position shown in full lines in FIG. 12 but can be cammed to the position indicated in broken lines during either assembly or disassembly. The pivoted latch has a rear transversely extending plate portion 516 which lies in a vertical plane and compression springs 518 extend between the plate portion to one side of the pivot pin and a spring backing plate 520. Both the plate portion 516 and the backing plate 520 are provided with spring mounting pins 522 (FIG. 14) to maintain the springs in position. The other end of the pivoted latch 512 is provided with a hook 524 and a cam surface 526. In order to secure the highway trailer to the adapter, the trailer is provided with a vertically extending latch bar 528 in the nose piece 530 which extends between the two pockets 532, 534 which receive the locating members 502 and 504. The nose piece has a vertical aperture 535 facing the latch and which can receive the latch. The cam surface 526 initially engages the latch bar during assembly and the latch 512 is swung away from its normal spring biased position to the dotted line position as the parts come together, and then assumes its normal latching position shown in full lines in FIG. 12 when the parts are fully assembled. At this point in time, the rear surface of the transversely extending sill (not shown) of the highway trailer will contact the stops 418, 420. Thus, the latch and stops 418 and 420 will maintain the highway trailer in its completely assembled position in such a manner that the highway trailer will not moved relative to the adapter.

In order to provide for disassembly of the highway trailer from the adapter, manually operable latch operating means are provided. These operating means include a cam 538 which is adapted to bear against a surface of the plate portion 516 of the latch. In this connection, both the cam and the springs bear against the forward surface of the plate portion 516 but to opposite sides of the latch pivot pin 514. As can be seen from FIG. 14, if the cam 538, which is shown in its normal inoperable position, were to be rotated in a clockwise direction, the plate portion 516 and latch 512 fastened thereto would be rotated in a counterclockwise direction as viewed in FIG. 12. In order to provide for such rotational movement, the cam is keyed to a cam operating shaft 540 which is journaled for rotation about its axis within the welded frame 404. The latch operating shaft is in turn provided with a handle 542 which provides for manual operation.

As it is desirable to know whether the latch is in its normal latching position shown in full lines or in its open position shown in dotted lines, latch indicating means are provided. The latch indicating means, which are indicated generally at 544, includes a latch indicator rod 546 which is carried by suitable apertures in the frame 404 for movement along its axis, a connector or shoulder piece 548 secured to one end of the rod 546, and a pointer rod 550 which extends to the right hand side (as viewed in FIG. 12) of the adapter. The end of the latch indicator rod 546 remote from the connector 548 bears against a cam 552 carried by the plate portion 516 of the latch. As can be seen from an inspection of FIG. 12, when the latch is in its latching position, the indicator rod will be biased to the right hand side against the pressure of a spring 554 disposed between the shoulder piece 548 and a portion of the adapter frame 404. However, should the latch be in its nonlatching position, shown in broken lines in FIG. 12, the pointer piece will shift to the left.

In this third embodiment, the intermodal adapter can be more readily assembled to the highway trailers than in the second embodiment. In addition, indicating means are also provided to indicate the position of the coupler pin as well as the latch. Finally, it should also be noted that in this design, as in the first and second embodiments, the weight of the highway trailers is supported concentrically above the centerplate 406 giving greater stability to the assembled unit.

The train of highway trailers will be made up in the same manner as that previously described.

While three different forms of apparatus have been disclosed, it should be noted that other forms of apparatus may be employed. Therefore, while preferred structures in which the principles of the present invention have been incorporated have been shown and described above, it is to be understood that this invention is not to be limited to the particular details shown and described above, but that, in fact, widely differing means may be employed in the practice of the broader aspects of this invention.

What is claimed is:

1. An improved train of highway trailers including leading and trailing trailers which are interconnected to each other and supported by railtrucks, each of said highway trailers including a main frame and one or more highway wheel assemblies, and each of said railtrucks being provided with a pair of side frames and a bolster supported on said side frames for limited rocking movement; said improvement comprising:

a forwardly extending tongue for each highway trailing trailer, said tongue having a forward vertically apertured portion and a rear portion secured to the main frame of the associated trailing highway trailer in load carrying relationship;

first receiving means interconnected to a rear portion of the main frame of each leading highway trailer, the first receiving means including a pair of spaced apart generally vertically aligned apertures;

an intermodal adapter supported on the bolster of each rail truck, the adapter in turn supporting the rear of an associated leading trailer and the front of an associated trailing trailer;

securing means securing the adapter to the rear portion of the associated leading trailer; and a coupler pin passing through the vertically aligned apertures of the first receiving means and the apertured portion of said tongue to maintain the forward portion of the tongue within the first receiving means, said tongue being supported by a portion of said first receiving means.

2. The improvement as set forth in claim 1 further characterized by the provision of wheel support means interconnecting said highway wheel assemblies to said main frame, said wheel support means being capable of moving the highway wheel assemblies between a lowered highway engaging position and a raised position.

3. The improvement as set forth in claim 1 further characterized by the provision of constant contact bearings disposed on laterally spaced apart portions of said bolster and contacting laterally spaced apart portions of said intermodal adapter to stabilize said intermodal adapter.

4. The improvement as set forth in claim 1 wherein said bolster is provided with a centrally located centerplate bowl, and said intermodal adapter is provided with a centerplate received within said centerplate bowl for rotation about a vertical axis.

5. The improvement as set forth in claim 4 wherein each leading highway trailer is further provided with second receiving means, and wherein each intermodal adapter includes forward locating means which is received within the second receiving means.

6. The improvement as set forth in claim 5 wherein the second receiving means is disposed below the first receiving means.

7. The improvement as set forth in claim 4 wherein said intermodal adapter is provided with an upwardly facing load carrying surface which supports the rear of said associated leading highway trailer.

8. The improvement as set forth in claim 7 wherein each of said leading highway trailers is provided with a transversely extending sill, a central portion of which is apertured and forms the bottom surface of said first receiving means, said sill being disposed upon said load carrying surface of the intermodal adapter.

9. The improvement as set forth in claim 8 wherein said aperture in said sill is above said centerplate bowl and coaxial with said vertical axis.

10. The improvement as set forth in claim 8 wherein said intermodal adapter is provided with a pair of vertically extending stops which are contacted by said transversely extending sill.

11. The improvement as set forth in claim 1 wherein said coupler pin is carried by said leading highway trailer, said leading trailer further including pin shifting means in the form of linkage.

12. The improvement as set forth in claim 1 wherein said first receiving means is provided with a lower elastomeric pad upon which the forward vertically apertured portion of the tongue may rest, said pad having a vertically extending aperture coaxial with said pair of spaced apart generally vertically aligned apertures.

13. An improved train of highway trailers including leading and following trailers which are interconnected to each other and supported by railtrucks, each of said highway trailers including a main frame and one or more highway wheel assemblies, each of said railtrucks being provided with a pair of side frames and a bolster supported on the side frames for limited rocking movement; said improvement comprising:

first receiving means interconnected to a rear portion of the main frame of each leading highway trailer, the first receiving means including a pair of spaced apart generally vertically aligned apertures;

a forwardly extending tongue for each following trailer, said tongue having a forward vertically apertured portion and a rear portion secured to the main frame of the associated following trailer in load carrying relationship, said tongue being supported by a portion of said first receiving means;

an intermodal adapter supported on the bolster of each rail truck, the adapter in turn supporting the rear of an associated leading trailer and the front of an associated following trailer;

securing means securing the adapter to the rear portion of the associated leading trailer; and a coupler pin carried by said intermodal adapter and capable of passing through the vertically aligned apertures of the first receiving means and the apertured portion of said tongue to maintain the forward portion of the tongue within the first receiving means, said adapter further including pin shifting means capable of moving the coupler pin from a raised position where it passes through the vertically aligned apertures of the first receiving means and the aperture portion of said tongue to a lowered position to disconnect the leading and following trailers.

14. The improvement as set forth in claim 13 wherein said pin shifting means is in the form of a screw jack.

15. The improvement as set forth in claim 13 further characterized by the provision of coupler pin indicating means carried by said intermodal adapter, said coupler pin indicating means being capable of indicating whether the coupler pin is in its raised or its lowered position.

16. An improved highway trailer being capable of being formed into a train of highway trailers which are interconnected to each other and supported by railtruck assemblies; said improved trailer comprising a main frame;

a forwardly extending tongue having a forward vertically apertured portion and a rear portion secured to the main frame of the trailer in load carrying relationship;

one or more highway wheel assemblies;

wheel support means interconnecting said highway wheel assemblies to said main frame, said wheel support means being capable of moving the highway wheel assemblies between a lowered highway engaging position and a raised position; and first and second receiving means interconnected to a rear portion of the main frame, the first receiving means being capable of receiving the forwardly extending tongue of another highway trailer, said first receiving means being provided with a pair of spaced apart generally vertically aligned apertures which may be placed in alignment with the vertical aperture of the forward portion of said forwardly extending tongue of another trailer, and said second receiving means being capable of receiving a locating portion of a railtruck assembly.

17. The improved highway trailer as set forth in claim 16 wherein the second receiving means is disposed below the first receiving means.

18. The improved highway trailer as set forth in claim 16 wherein said highway trailer is provided with a transversely extending sill capable of supporting said trailer and its load, a central portion of said sill being apertured and forming the bottom surface of said first receiving means.

19. The improved highway trailer as set forth in claim 16 wherein said first receiving means is provided with a lower elastomeric pad upon which the forward vertically apertured portion of the tongue of another highway trailer may rest, said pad having a vertically extending aperture coaxial with said pair of spaced apart generally vertically aligned apertures.

20. The improved highway trailer as set forth in claim 16 wherein said second receiving means includes a pair of transversely spaced apart sockets.

21. The improved highway trailer as set forth in claim 20 wherein each of said sockets has parallel sidewalls.

22. The improved highway trailer as set forth in claim 20 wherein each of said sockets has converging sidewalls which are more closely spaced together at a forward portion of the pocket than at a rear portion.

23. An improved highway trailer being capable of being formed into a train of highway trailers which are interconnected to each other and supported by railtruck assemblies, each of which has a locating portion and a latch; said improved trailer comprising
a main frame;
a forwardly extending tongue having a forward vertically apertured portion and a rear portion secured to the main frame of the trailer in load carrying relationship;
one or more highway wheel assemblies;
wheel support means interconnecting said highway wheel assemblies to said main frame, said wheel support means being capable of moving the highway wheel assemblies between a lowered highway engaging position and a raised position; and
first and second receiving means interconnected to a rear portion of the main frame, the first receiving means being capable of receiving the forwardly extending tongue of another highway trailer, said first receiving means being provided with a pair of spaced apart generally vertically aligned apertures which may be placed in alignment with the vertical aperture of the forward portion of said forwardly extending tongue of another trailer, and said second receiving means being capable of receiving a locating portion of a railtruck assembly, said second receiving means including a pair of transversely spaced apart sockets, and latch receiving means disposed between said sockets and capable of being engaged by a latch carried by a railtruck assembly to be coupled to said second receiving means.

24. The improved highway trailer as set forth in claim 23 wherein the latch receiving means is a longitudinally extending aperture capable of receiving a pivoted latch.

25. The improved highway trailer as set forth in claim 23 wherein the latch receiving means is a transversely extending aperture.

26. A railway train comprising trailer vehicles each having at its front end a fifth wheel coupling means adapted to couple with a fifth wheel coupling means of a highway tractor and at its back end rear wheels to support the back end of said vehicle while moving along a highway, a railway truck having railway wheels and a bolster with a load carrying vertical thrust bearing, an adapter frame rotatably supported by said bearing and having laterally spaced horizontal load carrying forks received in load carrying relation to the back end of one of said road trailers, a load carrying tongue on the front end of another trailer received in a socket member on the back end of said one trailer, said socket member being between said forks and in load carrying relation to said tongue, and a pin coaxial with said bearing and carried by said socket member and extending through said tongue to establish a push and pull draft connection between the tongue and said socket member, said bearing and pin being on a vertical axis between said forks.

27. An improved train of highway trailers including leading and following trailers which are interconnected to each other and supported by railtrucks, each of said highway trailers including a main frame and one or more highway wheel assemblies, and each of said railtrucks being provided with a pair of side frames and a bolster supported on said side frames for limiting rocking movement, said bolster being provided with a centrally located centerplate bowl; said improvement comprising
a forwardly extending tongue for each following highway trailer, said tongue having a forward vertically apertured portion and a rear portion secured to the main frame of the associated following highway trailer in load carrying relationship;
first receiving means interconnected to a rear portion of the main frame of each leading highway trailer, the first receiving means including a pair of spaced apart generally vertically aligned apertures;
an intermodal adapter supported on the centerplate bowl of the bolster of each railtruck for relative rotation about a generally vertically extending axis, the adapter in turn supporting the rear of an associated leading trailer and the front of an associated following trailer;
securing means securing the adapter to the rear portion of the associated leading trailer; and
a coupler pin coaxial with said generally vertically extending axis and passing through the vertically aligned apertures of the first receiving means and the apertured portion of said tongue to secure the forward portion of the tongue within the first receiving means for swinging movement about said vertical axis, said tongue being supported by a portion of said first receiving means.

28. A method of forming a train of highway trailers comprising the following steps:
(a) providing a plurality of highway trailers, each highway trailer having a main frame, a forwardly extending apertured tongue secured to the main frame of the trailer in load carrying relationship, one or more highway wheel assemblies, support means interconnecting the highway wheel assemblies to the main frame for relative vertical shifting movement, and first and second receiving means connected to a rear portion of the main frame and capable of receiving, respectively, a forwardly extending tongue of another highway trailer and a locating portion of a railtruck assembly;

(b) providing a plurality of railtruck assemblies each including a pair of side frames, a bolster supported on the side frames and having a centrally located centerplate bowl, and an intermodal adapter supported on the centerplate bowl for rotation about a generally vertically extending axis said intermodal adapter including forward locating means, latching means, support means, and vertically a shiftable coupler pin;

(c) driving a first highway trailer onto a track;

(d) positioning a first railtruck on said track behind said first trailer;

(e) backing the trailer towards the first railtruck until the forward locating means is fully received within the second receiving means on the trailer and until the latch engages the trailer;

(f) causing said highway wheel assemblies to be moved from their lowered position to their raised position;

(g) positioning a second highway trailer onto the track behind said first railtruck;

(h) moving the first highway trailer and first railtruck towards said second trailer until the forward portion of the tongue of the second trailer enters into the first receiving means;

(i) moving the coupler pin on the first truck from a lowered position to a raised position to cause the second trailer to become engaged with the first trailer and the first railtruck; and (j) repeating steps (d) through (i) until the train of highway trailers is fully made up.

29. An improved train of highway trailers including leading and following trailers which are interconnected to each other and supported by railtrucks, each of said highway trailers including a main frame and one or more highway wheel assemblies, each of said railtrucks being provided with a pair of side frames and a bolster supported on said side frames for limiting rocking movement; said improvement comprising:

first receiving means interconnected to a rear portion of the main frame of each leading trailer, the first receiving means including a pair of spaced apart generally vertically aligned apertures;

second receiving means interconnected to a rear portion of the main frame of each leading trailer, said second receiving means including a latch receiving portion;

a forwardly extending tongue for each following trailer; said tongue having a forward vertically apertured portion and a rear portion secured to the main frame of the associated following trailer in load carrying relationship, said tongue being supported by a portion of the first receiving means;

an intermodal adapter supported on the bolster of each rail truck, the adapter in turn supporting the rear of an associated leading trailer and the front of an associated following trailer, the intermodal adapter including forward locating means which is received within the second receiving means;

securing means interconnected to said intermodal adapter for securing the adapter to the rear portion of the associated leading trailer, said securing means including a latch which engages the latch receiving portion of said second receiving means to maintain the forward locating means within the second receiving means; and a coupler pin passing through the vertically aligned apertures of the first receiving means and the apertured portion of said tongue to maintain the forward portion of the tongue within the first receiving means.

30. The improvement as set forth in claim 29 wherein the forward locating means includes two transversely spaced apart locating members, and said second receiving means includes a pair of transversely spaced apart sockets which receives said locating members, the latch receiving portion being disposed between said sockets.

31. The improvement as set forth in claim 29 further characterized by the provision of a pivot on said intermodal adapter which interconnects the latch to said intermodal adapter.

32. The improvement as set forth in claim 31 wherein latch indicating means are provided to indicate whether the latch is in its latching position or whether it is unlatched.

33. An improved train of highway trailers including leading and following trailers which are interconnected to each other and supported solely by railtruck assemblies located at adjacent ends of said trailers, each of said highway trailers including a body and at least one highway wheel assembly supported above a rail track, and each of the railtruck assemblies including an intermodal adapter and a conventional railtruck having longitudinally extending side frames and a transversely extending bolster supported on said side frames for limited rocking movement, said bolster supporting said intermodal adapter; said improved train being characterized by said intermodal adapter being provided with a load bearing locating means and a vertically shiftable coupler pin;

the forward end portion of each following trailer including forwardly extending tongue means capable of supporting the forward end portion of the following trailer, said tongue means having a forward apertured portion which receives said coupler pin; and the rear end portion of each leading trailer including first receiving means which receives and is removably coupled to the forward end of said forwardly extending tongue means in load bearing relationship, said first receiving means having an aperture which receives said coupler pin, and second receiving means disposed below said first receiving means and which receives and is removably coupled to said locating means in load bearing relationship whereby the weight of the forward end portion of the following trailer and the rear end portion of the leading trailer are supported on the load bearing locating means of said intermodal adapter.

34. The improved train of highway trailers as set forth in claim 33 wherein said first receiving means includes a second aperture which receives said coupler pin, said second aperture being spaced away from said first mentioned aperture and in vertical alignment therewith, said forward apertured portion of said tongue means passing between said first mentioned aperture and said second aperture.

35. The improved train of highway trailers as set forth in claim 33 wherein said intermodal adapter is further provided with coupler pin shifting means.

36. The improved train of highway trailers as set forth in claim 33 further characterized by said bolster being provided with a centrally located centerplate bowl, the intermodal adapter being supported on said centerplate bowl for rotation about a generally vertically extending axis, and wherein the coupler pin is coaxial with said generally vertically extending axis.

37. A railway train comprising end to end trailer vehicles each having its highway engaging wheels supported above a railway track, a railway truck having railway wheels on the track and a bolster with a load carrying thrust bearing for supporting the rear end of one of said trailers, and for supporting a tongue attached to the forward end of another of said trailers, by said thrust bearing, for rotation about a vertical axis through the thrust bearing;

a socket in said one end of said one trailer for receiving the tongue of another of said trailers and having clearance permitting limited pivoting of the tongue about a vertical axis;

a vertical bearing in the end of the tongue; and a pin slidable in said socket on a vertical axis through said vertical bearing to establish a pivot connection between said tongue and said one trailer.

* * * * *

UNITED STATES PATENT AND TRADEMARK OFFICE
CERTIFICATE OF CORRECTION

PATENT NO. : 4,766,818

DATED : August 30, 1988

INVENTOR(S) : Harry O. Wicks et al.

It is certified that error appears in the above-identified patent and that said Letters Patent is hereby corrected as shown below:

Column 6, <u>line 17</u>, change "semi-traler" to -- semi-trailer"; column 11, <u>line 61</u>, change "moved" to -- move --; column 16, <u>line 25</u>, change "limiting" to -- limited --; column 17, <u>line 38</u>, change "limiting" to -- limited --.

Signed and Sealed this

Seventeenth Day of January, 1989

Attest:

DONALD J. QUIGG

Attesting Officer

Commissioner of Patents and Trademarks